US009091422B2

(12) United States Patent
Greenfield et al.

(10) Patent No.: US 9,091,422 B2
(45) Date of Patent: Jul. 28, 2015

(54) LED LIGHTING ELEMENT

(75) Inventors: Thomas F. Greenfield, Kings Park, NY (US); Gannon T. Gambeski, Saint James, NY (US); David P. Eckel, Fort Salonga, NY (US); Michael Glater, Brooklyn, NY (US); John M. Reilly, Port Jefferson, NY (US); Seckin K. Secilmis, Seaford, NY (US); William J. Zbytniewski, West Babylon, NY (US)

(73) Assignee: B/E AEROSPACE, INC., Wellington, FL (US)

( * ) Notice: Subject to any disclaimer, the term of this patent is extended or adjusted under 35 U.S.C. 154(b) by 0 days.

(21) Appl. No.: 13/035,626

(22) Filed: Feb. 25, 2011

(65) Prior Publication Data

US 2012/0014108 A1 Jan. 19, 2012

Related U.S. Application Data

(60) Provisional application No. 61/308,171, filed on Feb. 25, 2010, provisional application No. 61/345,378, filed on May 17, 2010.

(51) Int. Cl.
*B60Q 1/06* (2006.01)
*F21V 23/02* (2006.01)
(Continued)

(52) U.S. Cl.
CPC ................. *F21V 23/02* (2013.01); *F21S 4/008* (2013.01); *F21V 3/00* (2013.01); *F21V 15/01* (2013.01);
(Continued)

(58) Field of Classification Search
CPC ........ F21S 4/008; F21V 15/01; F21V 17/164; F21V 15/013
USPC .................. 362/373, 294, 370, 800, 234, 240
See application file for complete search history.

(56) References Cited

U.S. PATENT DOCUMENTS 4,729,742 A 3/1988 Onishi et al.
5,003,432 A 3/1991 Mandy
(Continued)

FOREIGN PATENT DOCUMENTS

EP 1901587 A2 3/2008
JP 2003-524284 A 8/2003
(Continued)

OTHER PUBLICATIONS

Supplemental Search Report issued in related application EP09816872.7, dated Aug. 22, 2012, 6 pages.
(Continued)

*Primary Examiner* — Anh Mai
*Assistant Examiner* — Jessica M Apenteng
(74) *Attorney, Agent, or Firm* — Drinker Biddle & Reath LLP

(57) ABSTRACT

An LED lighting element having an H-shaped housing. The housing, which may be an extruded housing, has a first section and a second section which is separated from the first section by a cross bar. A back plate is positioned opposite of the crossbar and is removably secured to the first section. A heat sink is located within the housing while a microcontroller and LED drive/control technology and integrated power supply contacts the heat sink and is attached to the back plate. An LED PC board that is electrically connected to the microcontroller and LED drive/control technology and integrated power supply is positioned in the second section and is attached to the housing. An end cap for the housing along with a method for constructing the lighting element are also disclosed.

33 Claims, 20 Drawing Sheets

(51) Int. Cl.

| | |
|---|---|
| ***F21S 4/00*** | (2006.01) |
| ***F21V 3/00*** | (2015.01) |
| ***F21V 15/01*** | (2006.01) |
| ***F21V 15/015*** | (2006.01) |
| ***F21V 17/16*** | (2006.01) |
| ***F21V 21/02*** | (2006.01) |
| ***F21V 27/00*** | (2006.01) |
| ***F21V 29/00*** | (2015.01) |
| *F21W 101/06* | (2006.01) |
| *F21W 101/08* | (2006.01) |
| *F21Y 101/02* | (2006.01) |
| *F21Y 103/00* | (2006.01) |

(52) U.S. Cl.

CPC ............ *F21V 15/013* (2013.01); *F21V 15/015* (2013.01); *F21V 17/164* (2013.01); *F21V 21/02* (2013.01); *F21V 27/00* (2013.01); *F21V 29/004* (2013.01); *F21W 2101/06* (2013.01); *F21W 2101/08* (2013.01); *F21Y 2101/02* (2013.01); *F21Y 2103/003* (2013.01); *Y10T 29/49117* (2015.01)

(56) References Cited

U.S. PATENT DOCUMENTS

| | | | |
|---|---|---|---|
| 5,129,597 | A | 7/1992 | Manthey et al. |
| 5,490,048 | A | 2/1996 | Brassier et al. |
| 5,677,603 | A | 10/1997 | Speirs et al. |
| 6,016,038 | A | 1/2000 | Mueller et al. |
| 6,211,626 | B1 | 4/2001 | Lys et al. |
| 6,220,721 | B1 | 4/2001 | Chan et al. |
| 6,552,495 | B1 | 4/2003 | Chang |
| 6,815,842 | B2 | 11/2004 | Fehd et al. |
| 6,967,447 | B2 | 11/2005 | Lim et al. |
| 7,114,827 | B2 | 10/2006 | Halter |
| 7,161,556 | B2 | 1/2007 | Morgan et al. |
| 7,173,383 | B2 | 2/2007 | Vornsand et al. |
| 7,198,387 | B1 | 4/2007 | Gloisten et al. |
| 7,266,315 | B2 | 9/2007 | Sato |
| 7,494,255 | B2 | 2/2009 | Bryan et al. |
| 7,658,506 | B2 | 2/2010 | Dowling |
| 7,717,593 | B2 | 5/2010 | Clark |
| 7,717,594 | B2 | 5/2010 | Clark |
| 7,969,404 | B2 | 6/2011 | Lee et al. |
| 8,013,533 | B2 | 9/2011 | De Rijck et al. |
| 8,708,560 | B2 | 4/2014 | Kraemer |
| 2003/0208764 | A1 | 11/2003 | Galipeau et al. |
| 2004/0090784 | A1 | 5/2004 | Ward |
| 2004/0183480 | A1 | 9/2004 | Halter |
| 2004/0240211 | A1 | 12/2004 | Rodgers et al. |
| 2005/0174309 | A1 | 8/2005 | Bouwens et al. |
| 2005/0202785 | A1 | 9/2005 | Meyer |
| 2005/0275912 | A1 | 12/2005 | Chen et al. |
| 2006/0187081 | A1 | 8/2006 | Gloisten et al. |
| 2007/0034775 | A1 | 2/2007 | Cheng et al. |
| 2007/0058377 | A1 | 3/2007 | Zampini, II et al. |
| 2007/0097675 | A1 | 5/2007 | Koren et al. |
| 2007/0103646 | A1 | 5/2007 | Young |
| 2007/0139941 | A1 | 6/2007 | Bryan et al. |
| 2007/0188427 | A1 | 8/2007 | Lys et al. |
| 2007/0200725 | A1 | 8/2007 | Fredericks et al. |
| 2007/0274084 | A1 | 11/2007 | Kan et al. |
| 2007/0285921 | A1 | 12/2007 | Zulim et al. |
| 2007/0291483 | A1 | 12/2007 | Lys |
| 2008/0089071 | A1 | 4/2008 | Wang et al. |
| 2008/0136334 | A1 | 6/2008 | Robinson et al. |
| 2008/0215279 | A1 | 9/2008 | Salsbury et al. |
| 2008/0266887 | A1 | 10/2008 | Wentland et al. |
| 2009/0001251 | A1 | 1/2009 | Ng et al. |
| 2009/0021955 | A1 | 1/2009 | Kuang et al. |
| 2009/0059610 | A1 | 3/2009 | Marshall et al. |
| 2009/0086472 | A1 | 4/2009 | Kinnune |
| 2009/0140630 | A1 | 6/2009 | Kijima et al. |
| 2009/0251898 | A1 | 10/2009 | Kinnune et al. |
| 2010/0007588 | A1 | 1/2010 | Zygmunt et al. |
| 2010/0019689 | A1 | 1/2010 | Shan |
| 2011/0096099 | A1 | 4/2011 | Yamamoto et al. |

FOREIGN PATENT DOCUMENTS

| | | | |
|---|---|---|---|
| JP | 2004-006253 | A | 1/2004 |
| JP | 2004-158370 | A | 6/2004 |
| JP | 2005513724 | A | 5/2005 |
| JP | 2005-517278 | A | 6/2005 |
| JP | 2005191004 | A | 7/2005 |
| JP | 2007-109584 | A | 4/2007 |
| JP | 2007123279 | A | 5/2007 |
| JP | 2007-249647 | A | 9/2007 |
| JP | 2008-109514 | A | 5/2008 |
| JP | 2008-135224 | A | 6/2008 |
| JP | 2008210588 | A | 9/2008 |
| JP | 2009503778 | A | 1/2009 |
| JP | 2010033806 | A | 2/2010 |
| JP | 20100509765 | A | 3/2010 |
| WO | 03/067934 | A2 | 8/2003 |
| WO | 2007/013003 | A1 | 2/2007 |
| WO | WO 2008/047335 | A1 | 4/2008 |
| WO | 2008/051464 | A1 | 5/2008 |
| WO | 2009/034060 | A1 | 3/2009 |
| WO | WO 2009/035493 | A1 | 5/2009 |
| WO | 2010/004871 | A1 | 1/2010 |

OTHER PUBLICATIONS

Office Action issued in related application JP2011-528100 with English translation, dated Jan. 10, 2013, 7 pages.

Hoelen, C., et al., "Color tunable LED spot lighting", Proceedings of the Sixth International Conference on Solid State Lighting (SPIE), Sep. 12, 2006, vol. 6337, pp. 63770Q-1-15.

International Search Report and Written Opinion issued in related application PCT/US2013/049974, Dec. 20, 2013, 7 pages.

Supplementary European Search Report and Written Opinion issued in related application EP11748155, Feb. 18, 2014, 8 pages.

Supplementary European Search Report and Written Opinion issued in related application EP11748130, Feb. 20, 2014, 9 pages.

Supplementary European Search Report and Written Opinion issued in related application EP11748178, Mar. 4, 2014, 10 pages.

Office Action issued in related application EP0981687.7, Jun. 18, 2013, 5 pages.

Office Action issued in related application JP2012-555185, Sep. 11, 2013, 7 pages.

Office Action issued in related application JP2012-555178, Sep. 11, 2013, 4 pages.

LED LIGHTING ELEMENT

CROSS-REFERENCE TO RELATED PATENT APPLICATIONS

This patent application claims the benefit of U.S. Provisional Patent Application No. 61/308,171, filed Feb. 25, 2010 and U.S. Provisional Patent Application No. 61/345,378, filed May 17, 2010. The contents of both being herein incorporated by reference.

FIELD OF THE INVENTION

This invention pertains to a light housing in general and, more particular, to a housing for LED lighting elements used to illuminate the inside of a space such as a vehicle or room.

BACKGROUND OF THE INVENTION

Housings for various light sources are well known in the art. Known housings have ranged from a simple shade that covered a light source and diffused the light to a rugged, heavy-duty housing that protects and disperses the light, as necessary. Incandescent lamps have traditionally been housed in light fixtures such as a translucent bowl or lens cover that diffuses and reduces the brightness of the light. Fluorescent lights have also been encased in a translucent housing that allows the light to be inserted and removed from a desired socket.

The evolution of lighting from incandescent to fluorescent to light emitting diodes has led to the need for improved housings in which to contain the light source while at the same time providing an enclosure for a power source or an electrical connector. LED lighting elements need to be able to be mounted at various angles and, often in odd locations. Unlike the traditional light bulb that is mounted in a particular socket, LED lighting elements can be strung along or behind various surfaces with their lighting output being directed in multiple directions. Therefore, an LED lighting element that would be capable of being mounted at various angles along with multiple LED lighting elements would be an important improvement in the art.

BRIEF SUMMARY OF THE INVENTION

An LED lighting element having an H-shaped housing is disclosed. The housing, which may be an extruded housing, has a first section and a second section which is separated from the first section by a cross bar. A back plate is positioned opposite of the crossbar and is removably secured to the first section. A heat sink is located within the housing while a microcontroller and LED drive/control technology and integrated power supply contacts the heat sink and is attached to the back plate. An LED PC board that is electrically connected to the microcontroller and LED drive/control technology and integrated power supply is positioned in the second section and is attached to the housing.

An end cap for the housing is also disclosed. The end cap attaches to at least one end of the housing. The end cap comprises a first element that has a first pair of mounting legs proximal to a first end. A second pair of mounting legs is adjacent to the second end, as is a cable access portion. A second element of the end cap has a cable access portion adjacent to a first end and a pair of mounting legs perpendicular to and adjacent the first end, wherein the first and second elements are made of a first material and the cable access portion of each element is made of a second material that is more flexible than the first material.

Also disclosed in a method for constructing an LED lighting element. The method involves: (a) providing an H-shaped, housing, said housing having a first section and a second section separated by a crossbar; (b) attaching a heat sink to a first side of a back plate; (c) placing a microcontroller and LED drive/control technology and integrated power supply over the heat sink; (d) securing the back plate to the housing; (e) placing an LED PC board in the second section; and (f) electrically connecting the LED PC board to the microcontroller and LED drive/control technology and integrated power supply. In another embodiment, an end cap is attached to each of a first and second end of the housing

BRIEF DESCRIPTION OF THE DRAWINGS

FIG. 2(*a*) is a perspective view and various other view of electrical connectors used in conjunction with an LED lighting element.

FIG. 4(*a*) is cut-away view showing an end view of an LED lighting element

FIG. 4(*b*) is a perspective view of an end of a housing of an LED lighting element.

FIG. 5(*a*) is a perspective view of a mounting clamp.

FIG. 5(*b*) is a perspective view showing mounting clamps attached to a mounting bracket in an embodiment used with an LED lighting element.

FIG. 5(*c*) is a perspective view showing mounting clamps attached to a mounting bracket in an embodiment used with an LED lighting element.

FIG. 5 (*d*) is a perspective view showing mounting clamps attached to a mounting bracket in an embodiment used with an LED lighting element.

FIG. 5 (*e*) is a perspective view showing mounting clamps attached to a mounting bracket in an embodiment used with an LED lighting element.

DETAILED DESCRIPTION OF THE INVENTION

Figure 1:
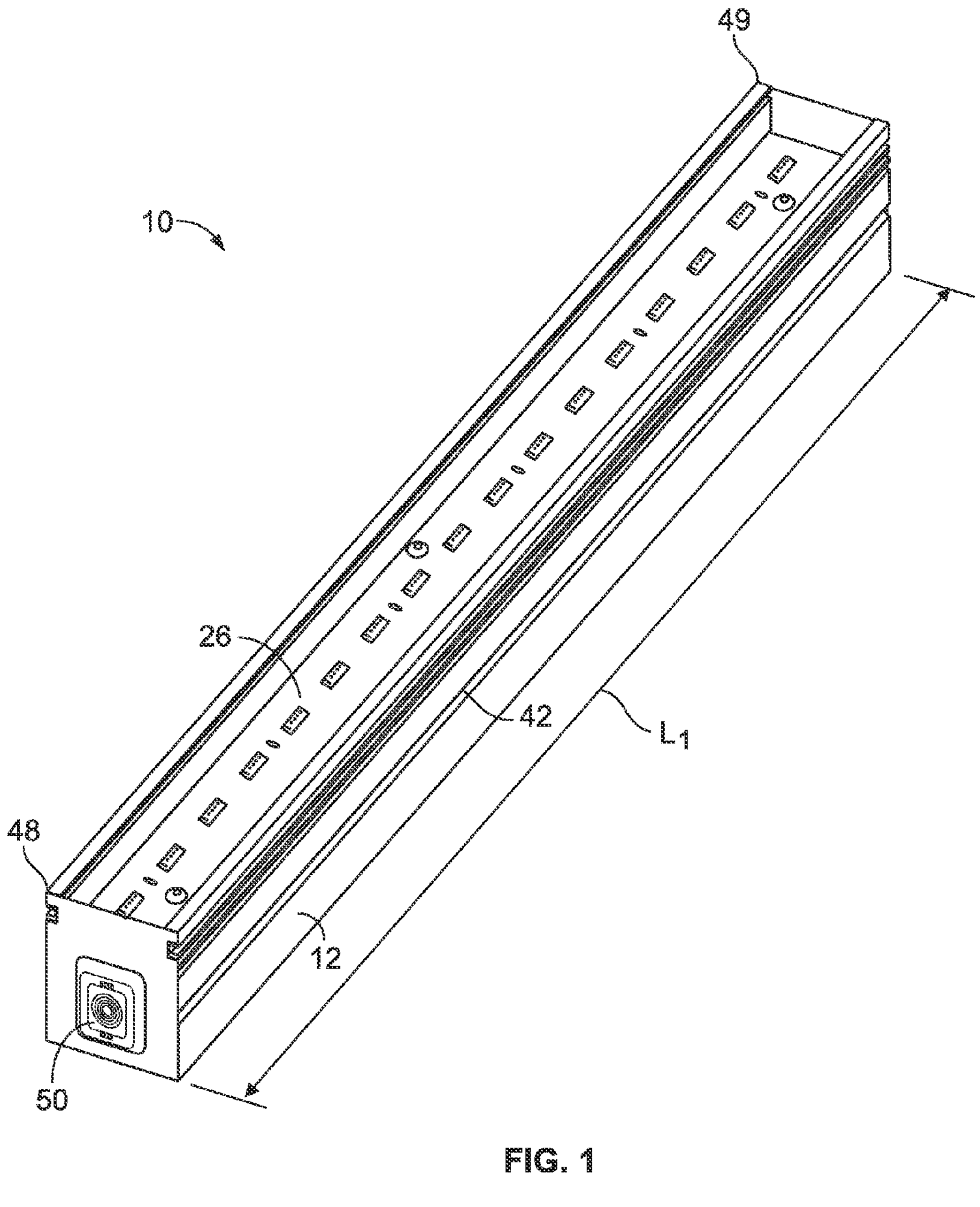
FIG. 1 is a perspective of an LED lighting element
Figure 2:
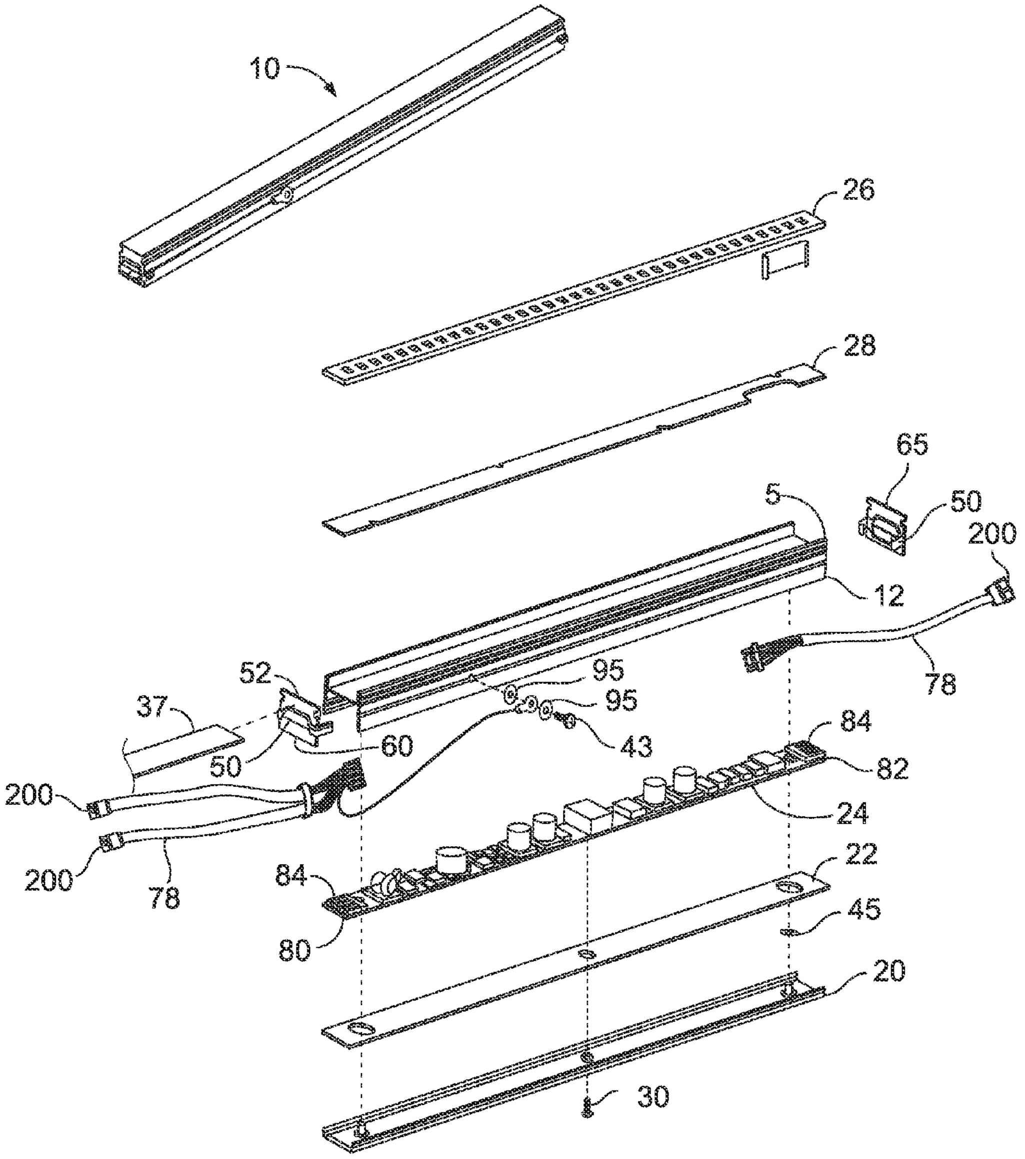
FIG. 2 is an exploded view of an LED lighting element.
Figure 3:
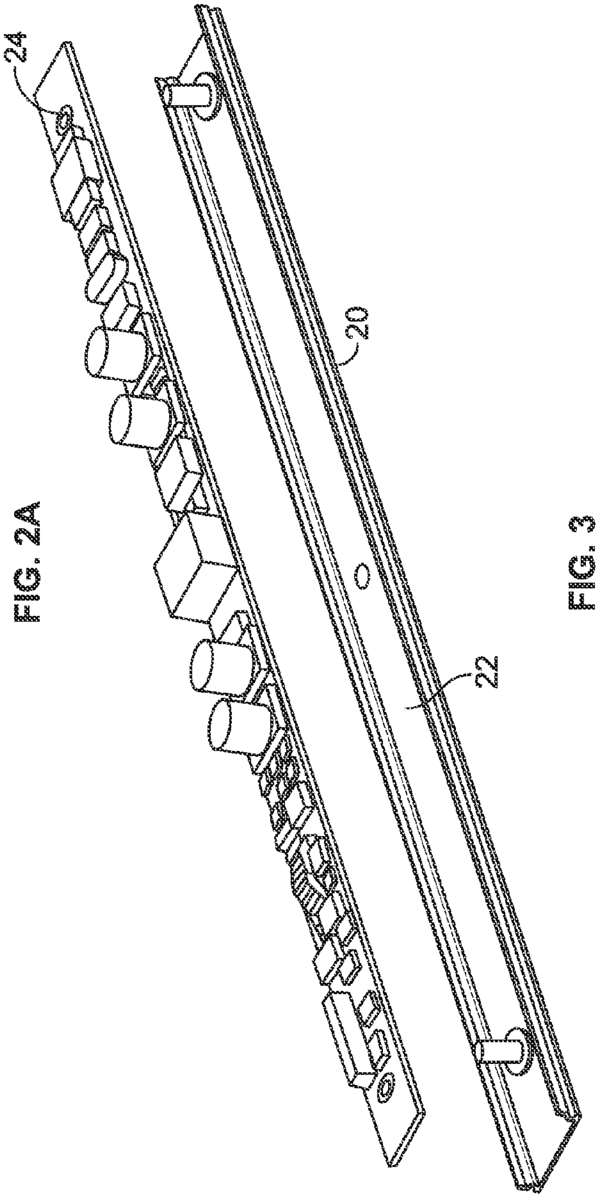
FIG. 3 is a perspective of the back plate with the microcontroller and LED drive/control and integrated power supply PC board used in the LED lighting element.
Figure 5:
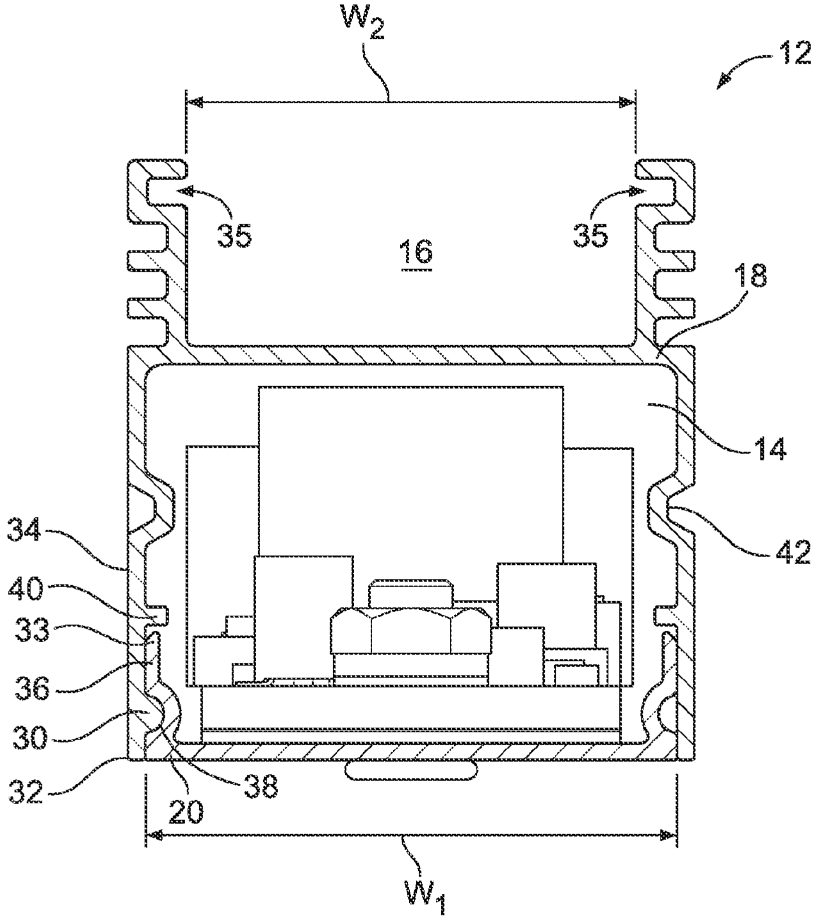
FIG. 5 is an end view of an LED lighting element with end cap removed.
Figure 5A:
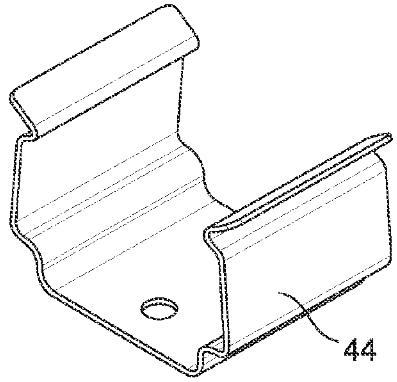
Figure 6:
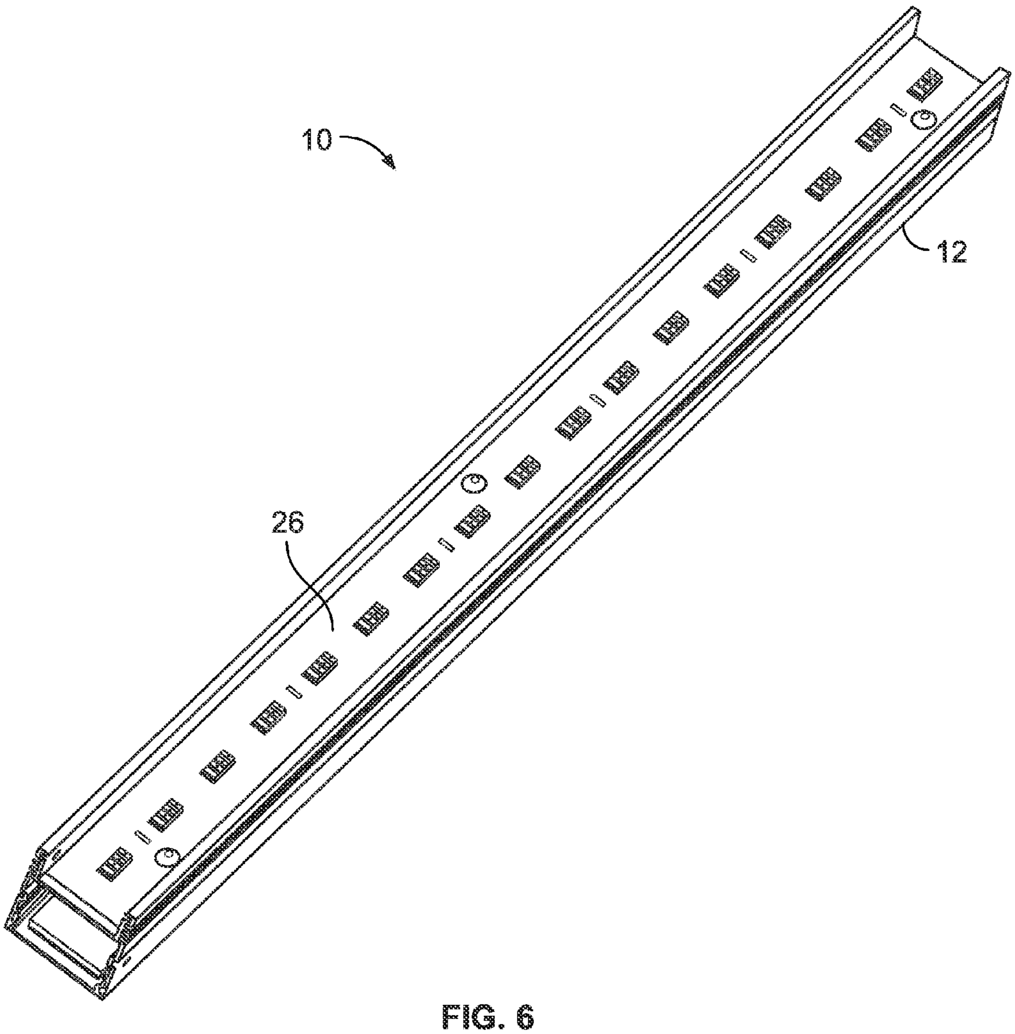
FIG. 6 is a perspective showing an LED PC board in the housing of an LED lighting element.
Figure 7:
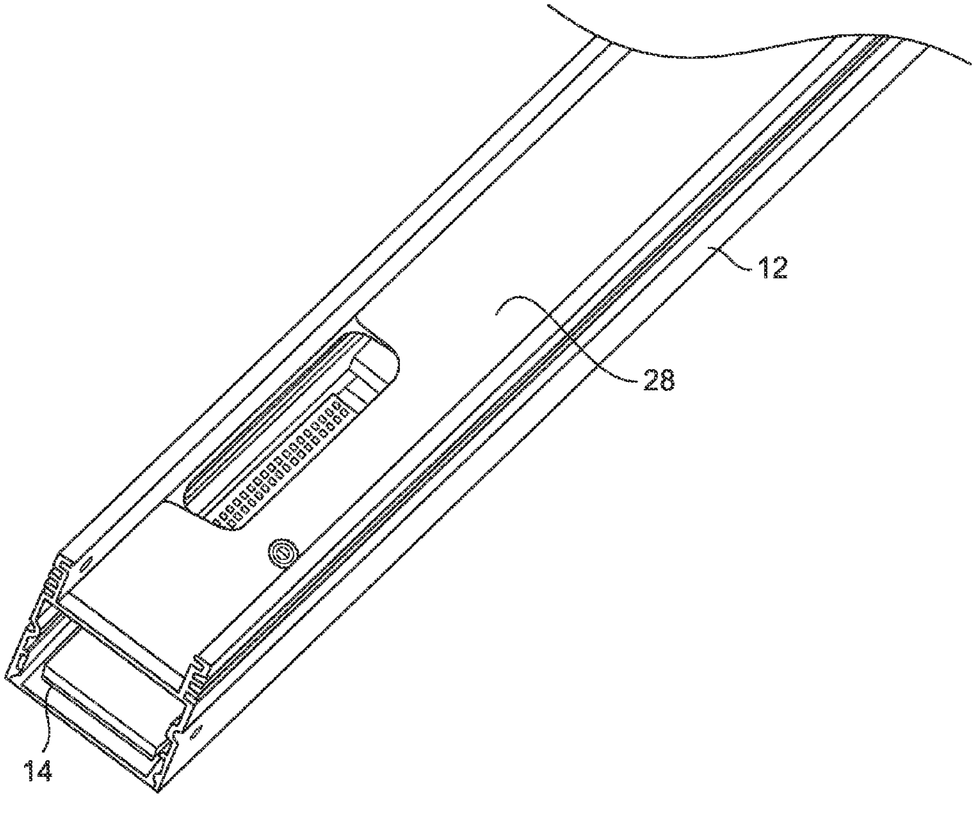
FIG. 7 is perspective showing a thermal pad mounted in a second section of an LED lighting element.
Figure 8:
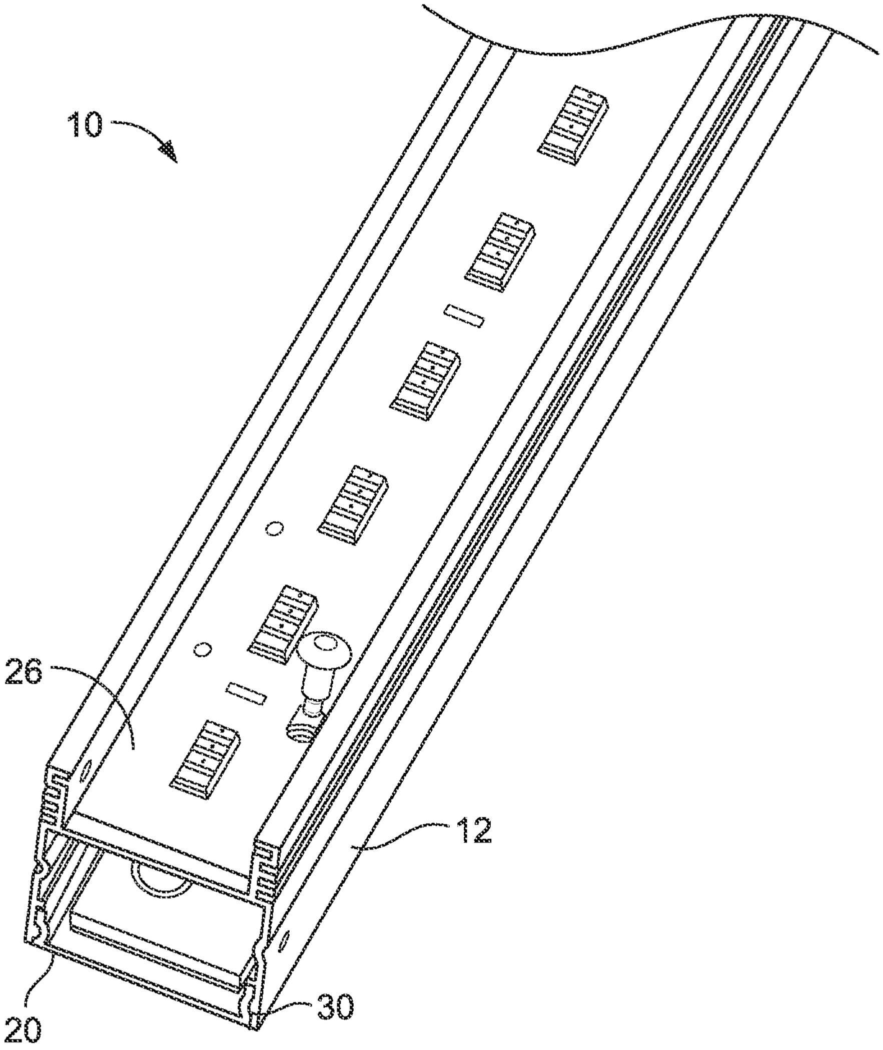
FIG. 8 is a perspective showing an LED PC board mounted in a second section of an LED lighting element.
Figure 9:
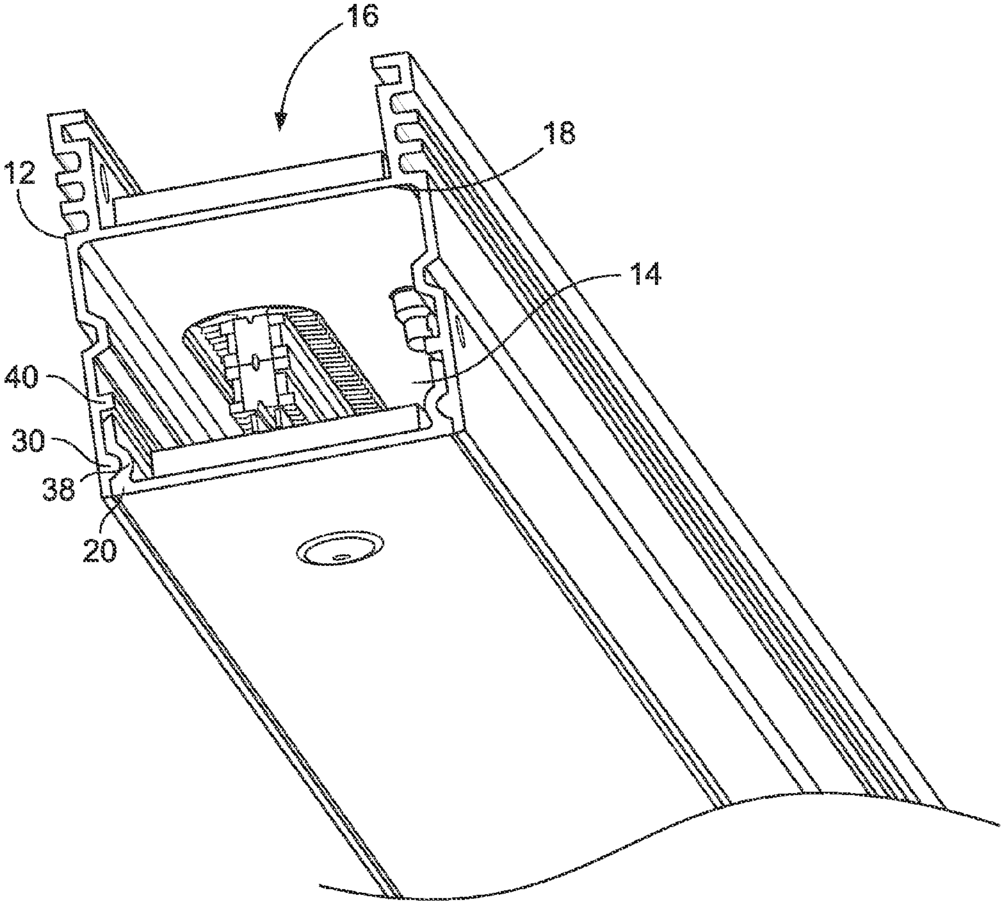
FIG. 9 is a perspective showing and end of an LED lighting element with end cap removed.

FIGS. 1, 2, 6, 8 and 9 show an LED lighting element 10 having an H-shaped housing 12. The housing 12, which may be an extruded housing, has a first section 14 and a second section 16 which is separated from the first section 14 by a cross bar 18, as shown in FIGS. 5 and 9. A back plate 20 is positioned opposite of the crossbar 18 and is removably secured to the first section 14, as shown in FIGS. 2, 5 and 9. A heat sink 22, as shown in FIGS. 2 and 3, is located within the housing 12 while a microcontroller and LED drive/control technology and integrated power supply 24 contacts the heat sink 22 and is attached to the back plate 20. An LED PC board 26 that is electrically connected to the microcontroller and LED drive/control technology and integrated power supply 24 is positioned in the second section 16 and is attached to the housing 12, as is shown in FIGS. 2, 6 and 8.

The H-shaped housing has a first height $h_1$. In a second embodiment, the housing may have a second height $h_2$ that is greater than $h_1$ so as to allow for the housing of a larger optic and to provide greater heat sinking capability.

In an embodiment, the heat sink 22 is a first thermal pad. In a more particular embodiment, as shown in FIGS. 2 and 3, the first thermal pad is adjacent to the back plate 20 and the microcontroller and LED drive/control technology and integrated power supply 24 overlies the thermal pad. In another embodiment, a second heat sink 28 is located in the second section 16. In a more particular version of such embodiment, the second heat sink 28 is a thermal pad that is positioned in the LED lighting element 10 between the crossbar 18 and the LED PC board 26, as shown in FIG. 2.

As shown in FIGS. 5, 8, and 9, a protrusion 30 extends inward from the housing 12 proximal to a first end 32 of a first side 34 of the first section 14. The back plate 20 includes a leg portion 36 that extends into the first section 14 and includes a protrusion receiving section 38. The protrusion 30 extending inward from the housing 12 snaps into the protrusion receiving section 38, thereby releaseably engaging the back plate 20 with the housing 14. A second protrusion 40, as shown in FIGS. 5 and 9, may also extend inward from the housing 12 into the first section 14. This second protrusion 40 limits the distance the firsts end 33 of the leg portion 36 of the back plate 20 can advance into the first section 14. Slots 35 are used to enclose an optic 37, as shown in FIGS. 4(*a*) and (*b*).

In an embodiment, as shown in FIG. 5, the first section 14 of the housing 12 has a first width $W_1$, the second section 16 of the housing 12 has a second width $W_2$, and the first width is greater than the second width. The housing 12 also has a first length $L_1$, as shown in FIG. 1, a groove 42 on the outer surface may extend along the length $L_1$ of the housing 12. This groove 42 is used to mount the housing 12 on a mounting clamp 44, as shown in FIG. 5(*a*). In one embodiment, the groove 42 is located between the crossbar 18 and the back plate 20.

Figure 4:
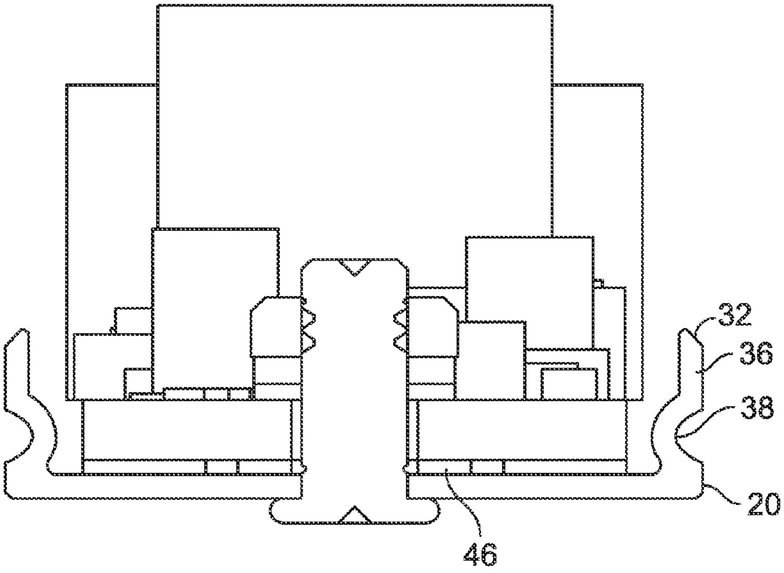
FIG. 4 is a sectional view showing the IPS PC board mounted on the back plate.
Figure 4A:
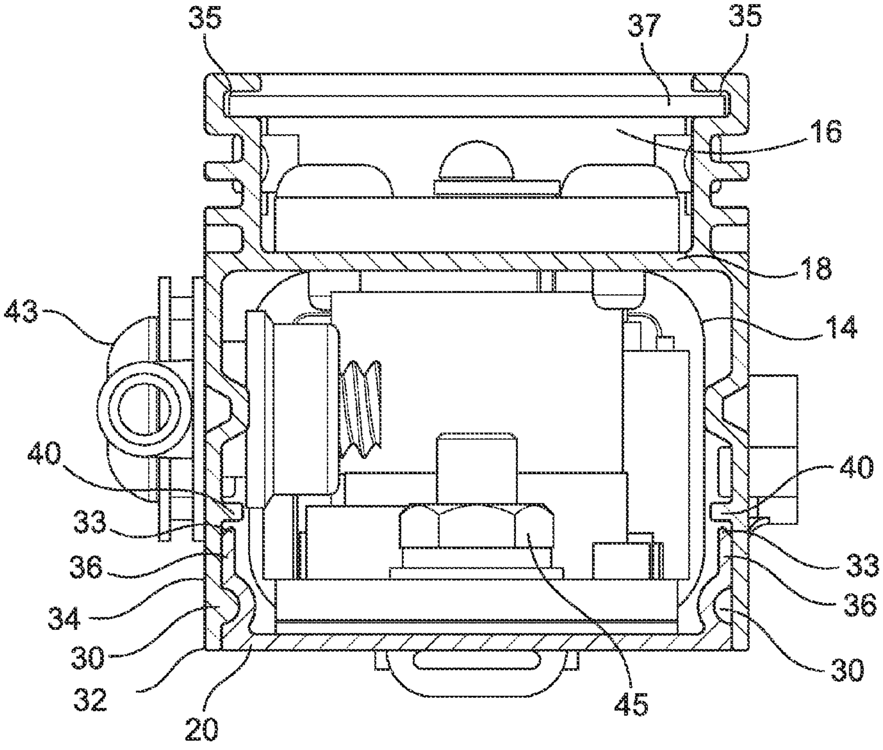

In an embodiment, as shown in FIG. 4, a washer 46 is located between the heat sink 22 and the back plate 20. This aluminum washer 46 may serve as the primary electrical bonding and grounding path from the microcontroller and LED drive/control technology and integrated power supply PC board 24, to the back plate 20. As shown in FIG. 4(*a*), a primary electrical grounding path is established through the snap fit interface between the housing 12 and the back plate 20. A secondary electrical grounding path is shown in FIG. 4(*b*) and involves a grounding wire connected at a first end through a ring terminal to a screw, bolt or like 43 on the outside of the housing 12, and at a second end to the microcontroller and LED drive/control technology and integrated power supply PC board 24 inside of the housing 12. The connecting bolt 43 and the back plate mounting stud and hex nut 45 are made of Cadmium plated hardware to allow for grounding and the joining of dissimilar metals. Wiring bundle 78 that extends from the housing 12, as shown in FIG. 4(*b*), may include up to two static ground lines that each provide a static ground for an LED lighting element 10.

Figure 10A:
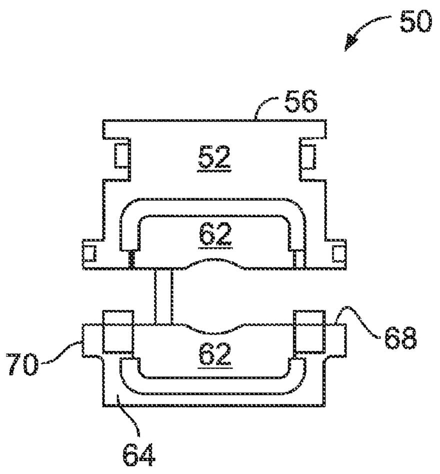
FIG. 10A is view of one embodiment of an end cap assembly.
Figure 10B:
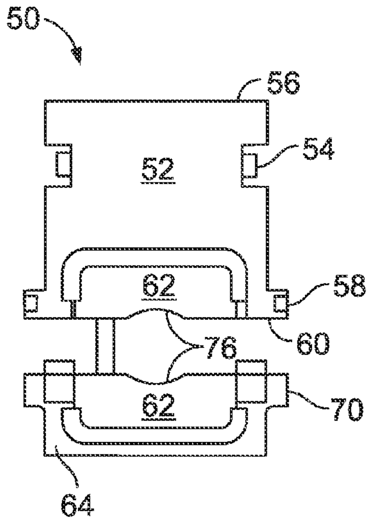
FIG. 10B is a view of a second embodiment of an end cap assembly.
Figure 11:
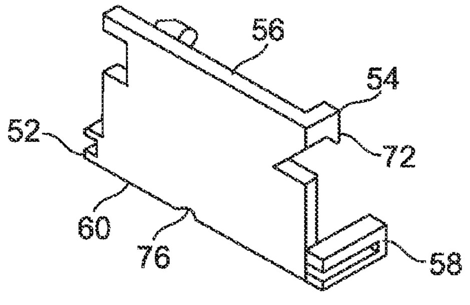
FIG. 11 is a perspective of the first element of the end cap assembly.
Figure 12:
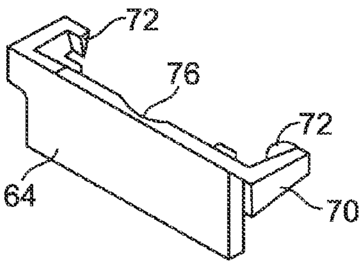
FIG. 12 is a perspective of the second element of the end cap assembly.

In still another embodiment, the housing 12 has at least one end 48, and an end cap 50 attaches to the at least one end 48, as shown in FIGS. 1 and 2. In a more particular embodiment, as shown in FIGS. 10-12, the end cap 50 comprises a first element 52 that has a first pair of mounting legs 54 proximal to a first end 56. A second pair of mounting legs 58 is adjacent to the second end 60, as is a cable access portion 62. A second element 64 of the end cap 50 has a cable access portion 62 adjacent to a first end 68 and a pair of mounting legs 70 perpendicular to and adjacent the first end 68, wherein the first and second elements 52, 64 are made of a first material and the cable access portion 62 of each element is made of a second material that is more flexible than the first material.

In an embodiment, the cable access portion 62 of the first element 52 is capable of separating from the cable access portion 62 of the second element 64. In such an embodiment, connection prongs 72 extend from the end of each of the mounting legs 70, as shown in FIGS. 2, 11, and 12. These connection prongs 72 fit in respective holes 74 in the side of the housing 12, thereby connecting the first and second element 52, 64 of the end cap 50 to the housing 12. The first element 52 of the end cap 50 secures the optic 37 from axial motion.

When in operation, the end cap 50 is fitted over an end of the LED lighting element 10. The two part end cap 50 is secured to the lighting element 10 by the mounting legs 70 engaging an opening 74 in the side of the lighting element housing 12. Once both elements 52, 64 of the end cap 50 are secured to the housing 12, the cable access portion 62 of each element 52, 64 align with one another. In an embodiment, as shown in FIGS. 10-12, a slight curvature 76 is formed in the edge of each element's cable access portion 62. Such curvatures 76 are, preferably, aligned with each other in the center of the cable access portions 62.

Figure 2A:
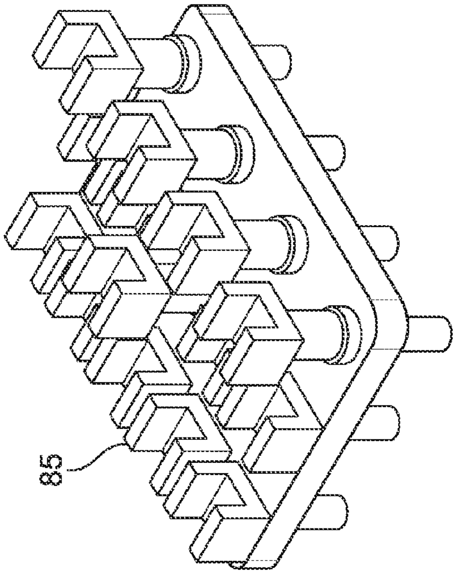
Figure 4B:
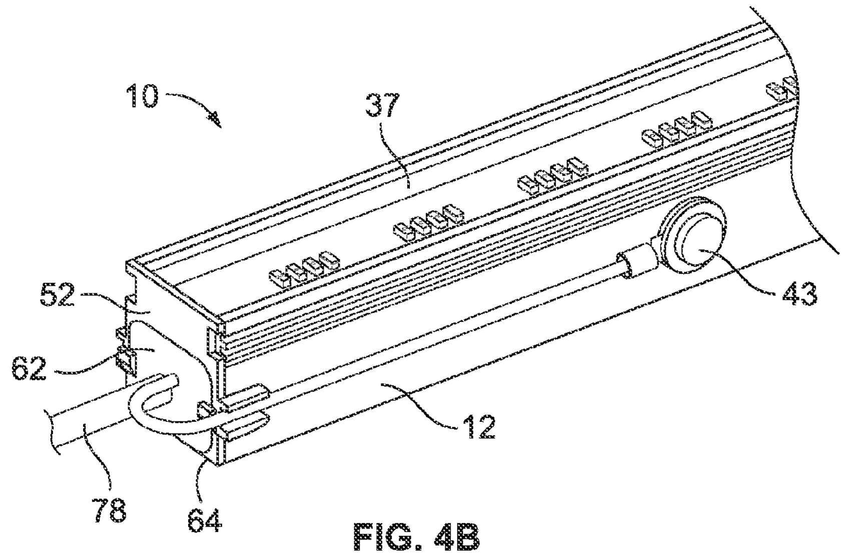

As shown in FIG. 4B, the flexible material of the cable access portions 62 allows a wire or cable bundling 78 to extend from a connector 84 in a first LED lighting element housing 12, through the cable access portion 62 of the end cap 50 to either a second LED lighting element housing 12 or a connector outside of the first LED lighting element housing 12. Attached to one end of the wire or cable bundling 78 is a connector 85, an embodiment of which is shown in FIG. 2A. This connector 85 connects with the connector 84 in the housing 12. By allowing a cable or wire bundle 78 to extend through the cable access portion 62 of each end cap 50 to connect with a second LED lighting element housing 12, a series of housings 12 can be strung together while being electrically connected to one another.

When in operation, electrical power and control signals are transmitted from an electrical power source such as a vehicle's electrical system and a master controller through the wire or cable bundling 78 to the microcontroller and LED drive/control technology and integrated power supply 24. The microcontroller then sends pulse width modulation ("PWM") values to an LED driver chip located on the microcontroller and LED drive/control technology and integrated power supply 24. The LED drive chip uses the PWM values to electronically control the intensity/brightness of the LEDs, thereby causing the LEDs to illuminate in a desired lighting scene.

Figure 13:
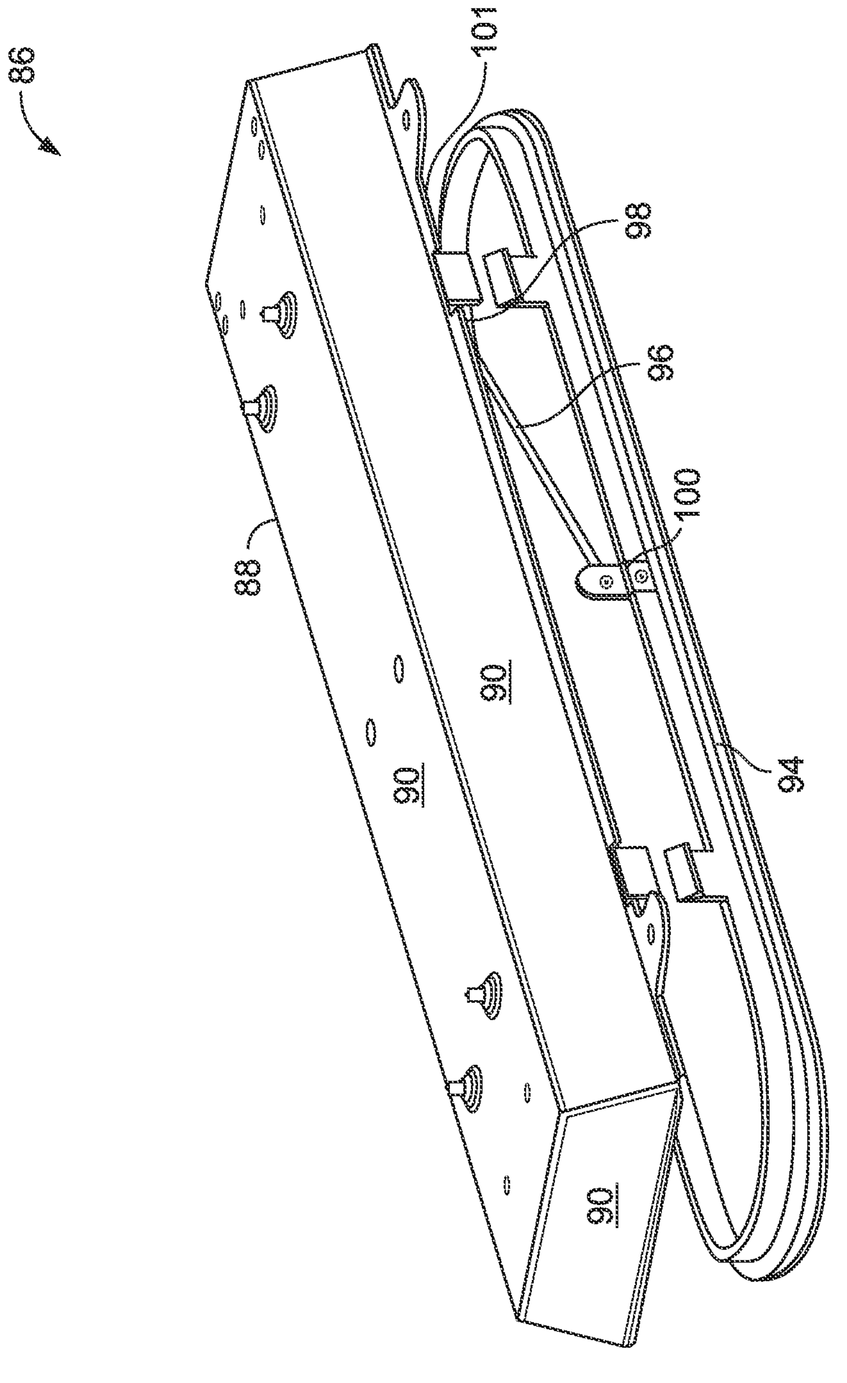
FIG. 13 is a perspective view of one embodiment of a housing for an LED lighting element
Figure 14:
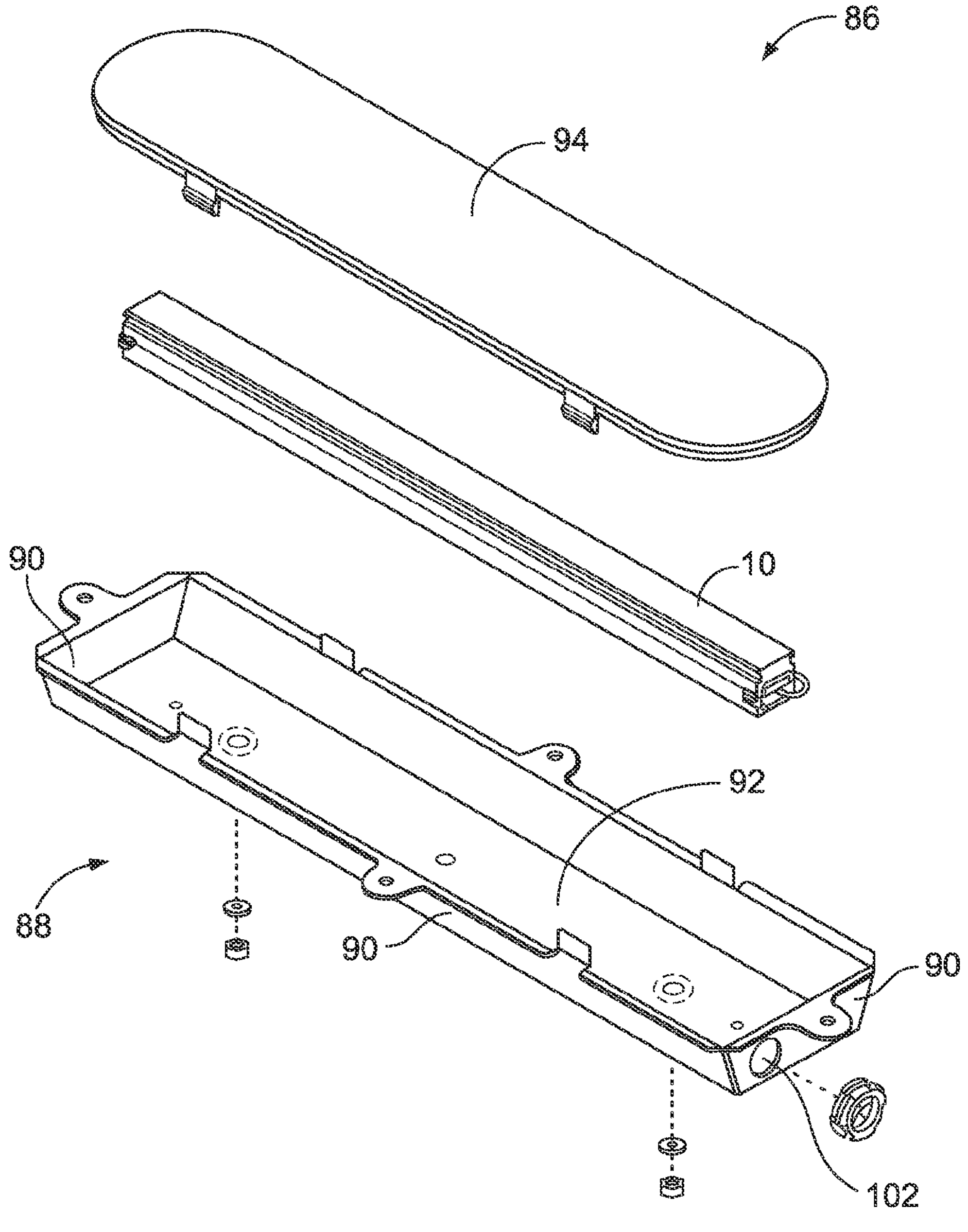
FIG. 14 is an exploded view of one embodiment of a housing for an LED lighting element.

In an embodiment, as shown in FIGS. 13-16, the lighting element 10 is itself enclosed in a housing 86, the housing 86 is comprised of a first component 88 having a plurality sides 90 that define a void 92 suitable for receiving the LED lighting element 10. A lens 94 is removably attached to the first component 88, thereby enclosing the void 92. In a particular version of this embodiment, the lens 94 snaps together with the first component 88. In a more particular version, the void 92 is shaped like a channel, as shown in FIG. 14.

In another embodiment, the lens 94 is secured to the first component 88 through the use of a lanyard 96 having a first end 98 that is attached to the first component 88, and a second end 100 that is attached to the lens 94 so as to secure the lens 94 to the first component 88, as shown in FIG. 13. In a more particular version of this embodiment, the first end 98 of the lanyard 96 is attached to an inner surface 101 of one of the plurality of sides 90 of the first component 88, as shown in FIG. 13.

Figure 15:
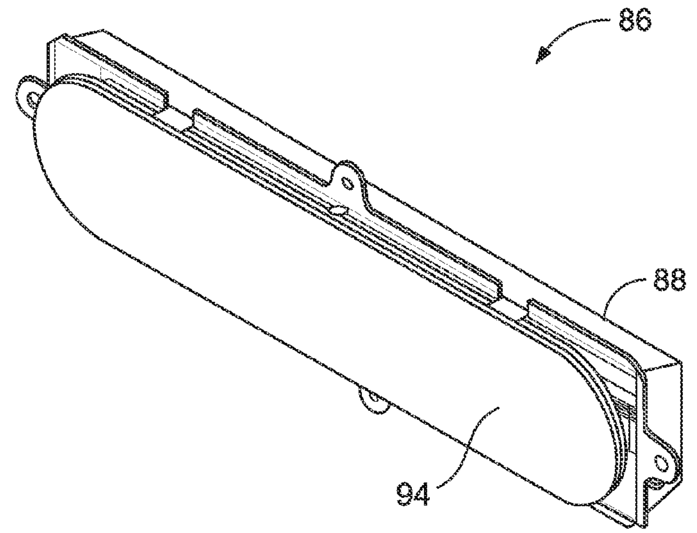
FIG. 15 is a perspective view of one embodiment of a housing for an LED lighting element.
Figure 16:
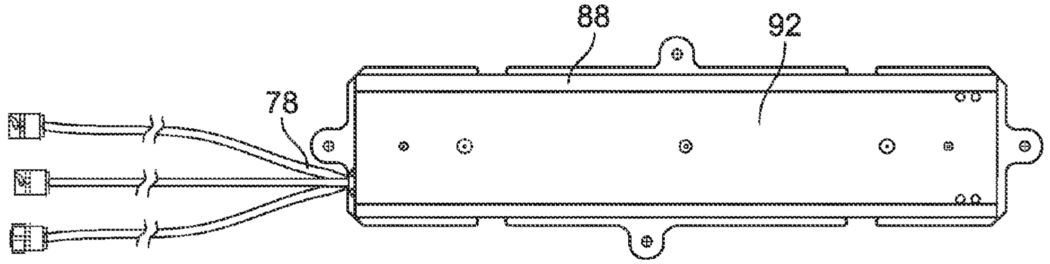
FIG. 16 is a bottom view of the first component of one embodiment of a housing for an LED lighting element.

In still another embodiment, one of the plurality of sides 90 of the first component 88 defines a hole 102, as shown in FIG. 14. In another embodiment, one of the plurality of sides 90 is rectangular, and at least two of the plurality of sides 90 are trapezoids, with each of the two trapezoidal sides being opposite one another, as shown in FIGS. 13 and 15. In a more particular version of this embodiment, at least one of the two trapezoidal sides 90 defines a hole 102. In a more particular version of this embodiment, the first component 88 has five sides 90.

In an embodiment, the lens 94 is in the shape of oval, as shown in FIGS. 13-15. The lens 94 may also have a smooth outer surface. A wiring bundle 78 may also extend through the hole 102.

When in operation, the LED lighting element 10 is positioned in the first component 88 of the housing 86 through the use of screws, bolts, or the like. The first component 88 of the housing 86 is then secured to a mounting surface such as an aircraft cabin bulkhead. In an embodiment, the housing 86 may be secured to an aircraft cabin bulkhead through the use of screws or the like inserted in holes in the mounting flanges that are on the first component 88, as shown in FIGS. 13-16. The lens 94 is then secured to the first component 88 by any suitable means including being snapped into place.

Figure 17:
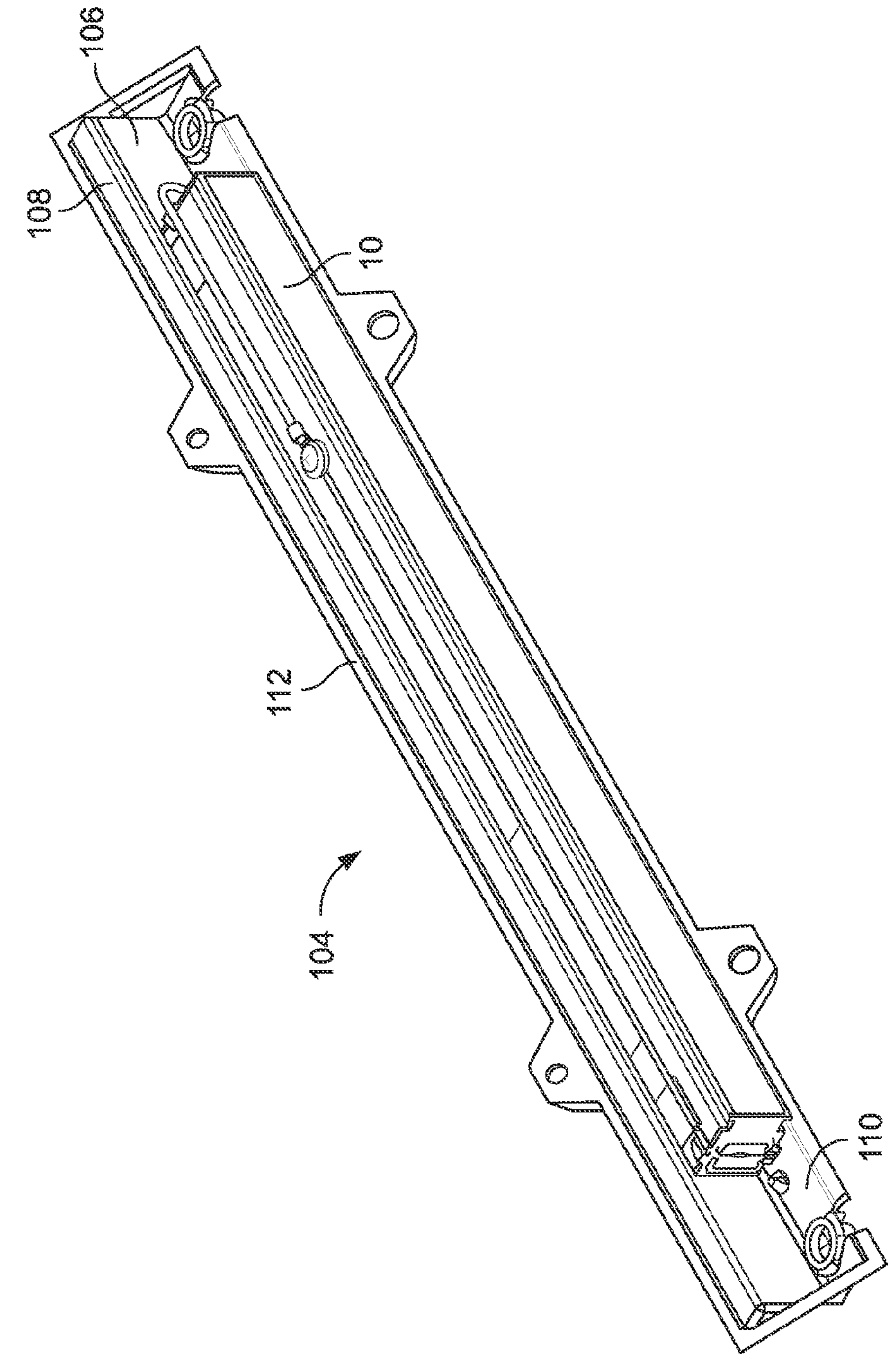
FIG. 17 is a perspective view of a second embodiment of a housing for an LED lighting element.

In still another embodiment, the lighting element 10 is itself attached to a housing 104 that is comprised of a lighting-element mounting portion 106 that has a first surface 108 that extends approximately 90° from the lighting-element mounting portion 106, and a second surface 110 that extends approximately 90° from the lighting-element mounting portion 106 opposite the first surface 108, as shown in FIG. 17. A cabin mounting bracket 112 surrounds the lighting-element mounting portion 106. In an embodiment, the cabin mounting bracket 112 is angled approximately 45° with respect to the lighting-element mounting portion 106.

Figure 18:
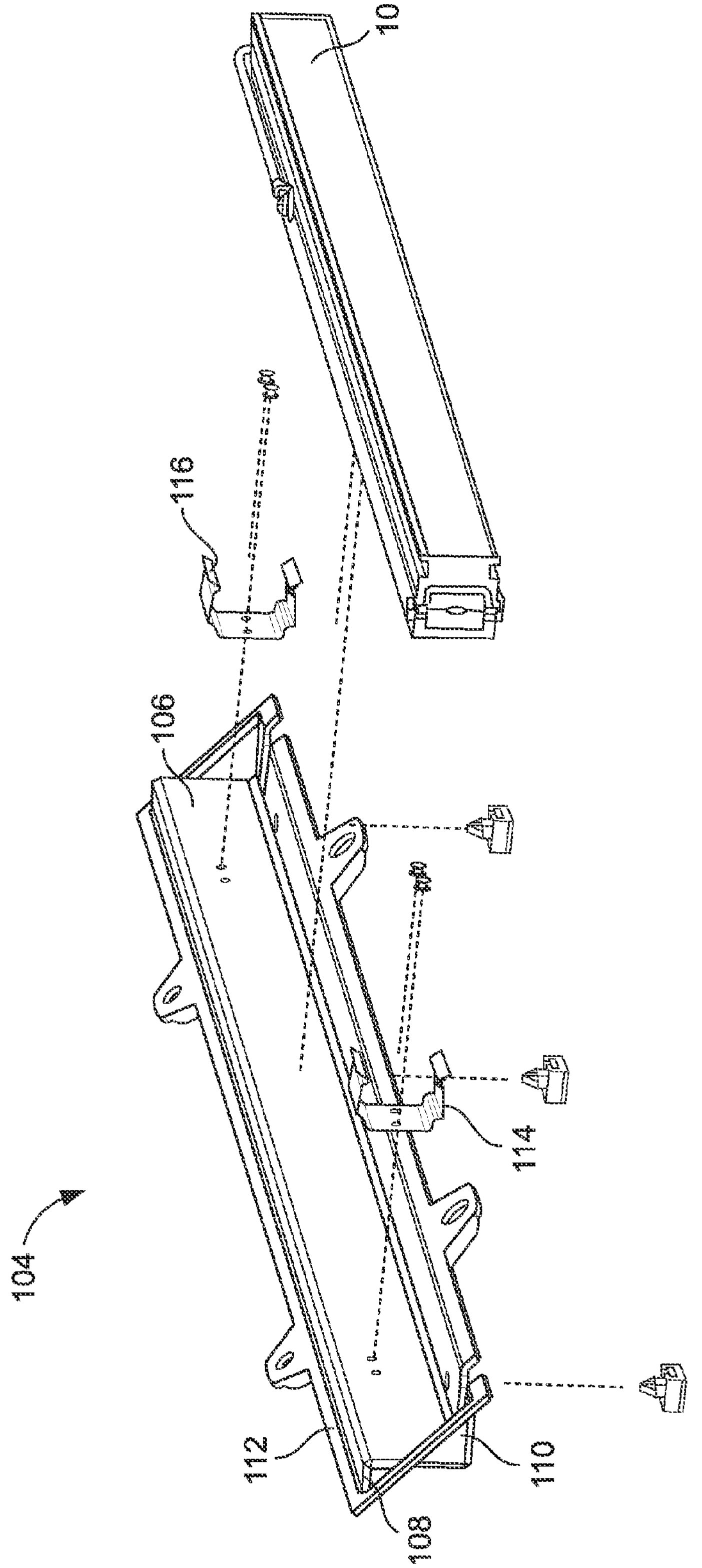
FIG. 18 is an exploded view of a second embodiment of a housing for an LED lighting element.

As shown in FIG. 17, the LED lighting element 10 may be mounted flush to the lighting-element mounting portion 106. In another embodiment, a first 114 and a second 116 mounting clamp are attached to the lighting-element mounting portion 106, and the LED lighting element 10 is attached to the mounting clamps 114, 116, as shown in FIG. 18.

Figure 19:
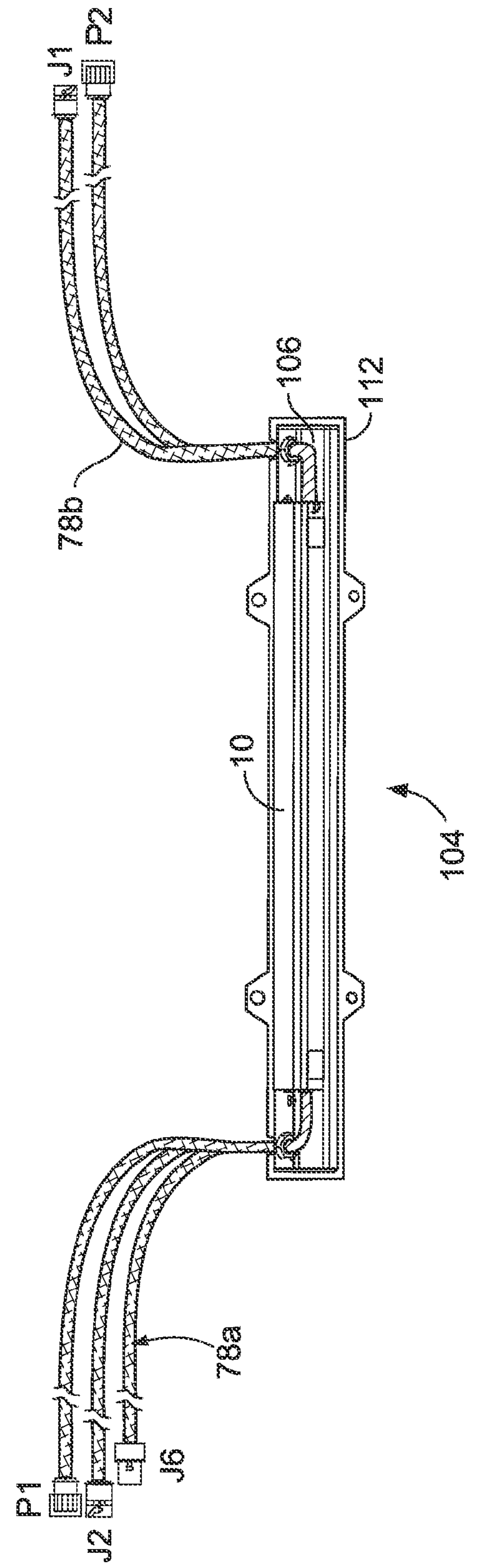
FIG. 19 is a front view of a second embodiment of a housing for an LED lighting element.

In another embodiment, a first and a second wiring bundle 78(*a*) and 78(*b*) extend from the housing 104, as shown in FIG. 19. In a particular version of this embodiment, the second wiring bundle 78(*b*) is connected to a main power source (not shown), and the first wiring bundle 78(*a*) is connected to an emergency power source (not shown).

When in operation, the LED lighting element 10 is mounted on the lighting-element mounting portion 106, of the housing 104. In a particular version of this embodiment, mounting clamps are 114 and 116 are attached to the mounting portion 106. The LED lighting element is then pressed into the mounting clamps 114 and 116 until the edge of each clamp engages the groove 42 that extends along the housing 12 of the lighting element 10. The housing 104 is then secured to a mounting surface such as a vehicle bulkhead through the use of screws or the like inserted in the holes in the mounting flanges on the cabin mounting bracket 112.

A method for constructing an LED lighting element 10 is also disclosed. The method involves: (a) providing an H-shaped, housing 12, said housing 12 having a first section 14 and a second section 16 separated by a crossbar 18; (b) attaching a heat sink 22 to a first side of a back plate 20; (c) placing a microcontroller and LED drive/control technology and integrated power supply 24 over the heat sink 22; (d) securing the back plate 20 to the housing 12; (e) placing an LED PC board 26 in the second section 16; and (f) electrically connecting the LED PC board 26 to the microcontroller and LED drive/control technology and integrated power supply 24. In another embodiment, an end cap 50 is attached to each of a first 48 and second end 49 of the housing 12.

In another embodiment, the microcontroller and LED drive/control technology and integrated power supply 24 has a first end 80 and a second end 82, and an electrical connector 84 is attached to the microcontroller and LED drive/control technology and integrated power supply 24 adjacent to at least one of the first 80 and second 82 end. In a more particular version of the embodiment, a wiring bundle 78 is electrically connected to the electrical connector 84, as shown in FIGS. 2 and 2(*a*). The wiring bundle 78 then extends outward from the housing 12. Electrical connector 84 and wiring bundle 78 mating interface 85 provides wire bundle strain relief as well as providing the ability to allow the use of different connector 200 variations or types.

Figure 20:
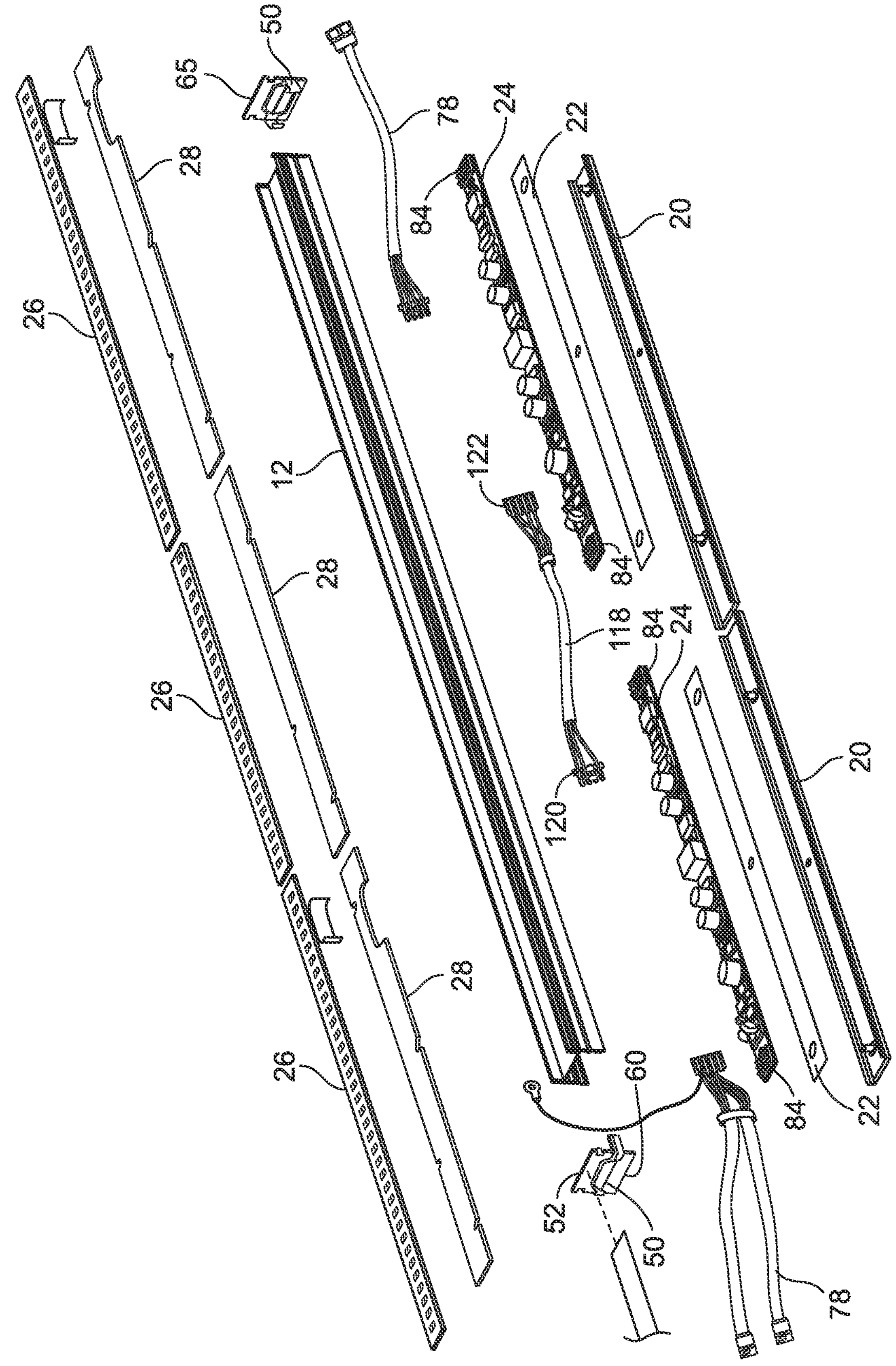
FIG. 20 is a perspective view showing two microcontroller and LED drive/control technology and integrated power supplies joined by a wiring harness in a single elongated LED lighting element.

In another embodiment, as shown in FIG. 20, a wiring harness 118 has as first end 120 connected to the electrical connector 84; and a second end 122 connected to a second electrical connector 84 on a second microcontroller and LED drive/control technology and integrated power supply 24.

Figure 5B:
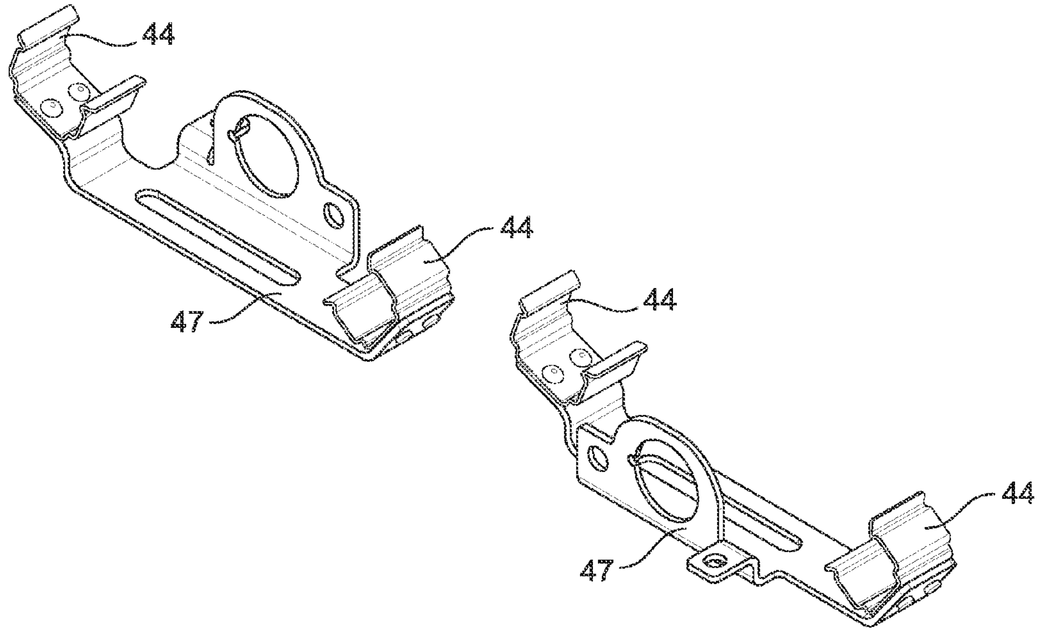
Figure 5C:
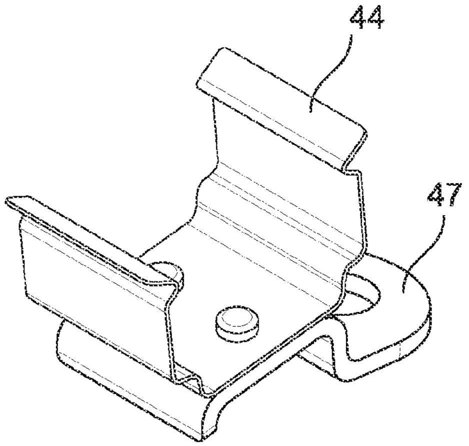
Figure 5D:
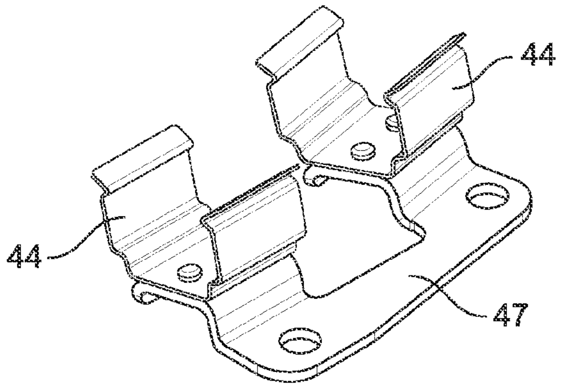
Figure 5E:
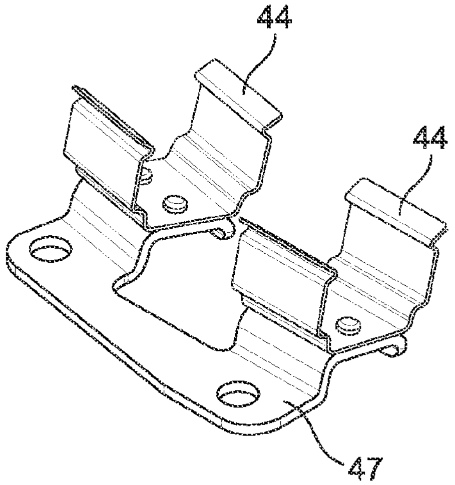

In still another embodiment of the method, the H-shaped housing 12 has a first side and a second side, and a groove 42 is scored along each of the first and second sides. A mounting clamp 44 is then fitted into the groove 42 along each of the first and second sides. The mounting clamp 44 is capable of being attached to various types of bracket geometries, as shown in FIGS. 5B-D. End cap legs 58 and 70 act as stops such that the housing does not axially slide out of the mounting clamps 44.

Figure 21:
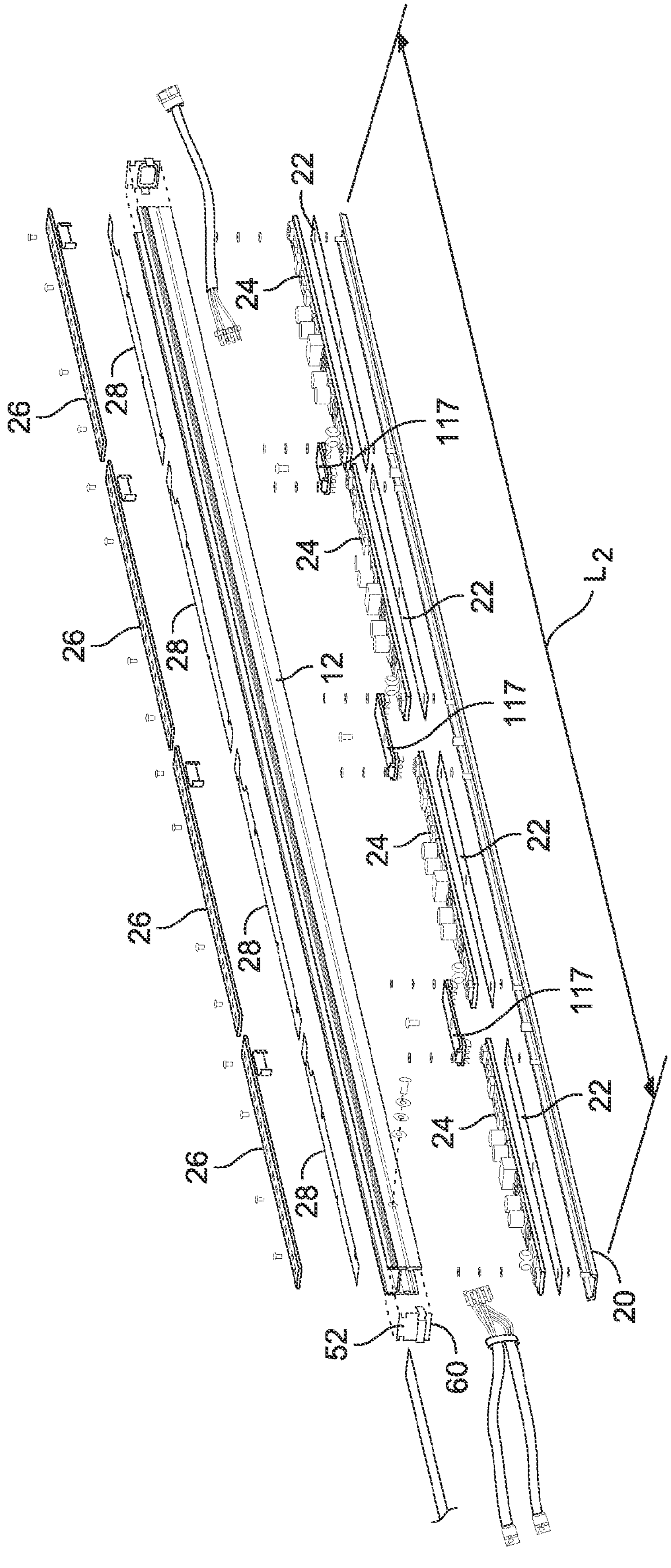
FIG. 21 is a perspective view showing two microcontroller and LED drive/control technology and integrated power supplies joined by a PC board in a single elongated LED lighting element.

In another embodiment the housing 12 has a second length $L_2$ that is greater than the first length $L_1$. This longer housing length $L_2$ can accommodated the utilization of several microcontroller and LED drive/control technology and integrated power supplies 24 connected together by interconnected PC boards 117, as shown FIG. 21, or interconnected wire harnesses 118, as shown in FIG. 20.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. An LED lighting element comprising:

an H-shaped housing, said housing having a first section and a second section separated from the first section by a crossbar;

a back plate opposite the crossbar, said back plate removably secured to the first section;

a heat sink located within the housing;

lighting element circuitry comprising a microcontroller and LED drive/control technology and integrated power supply contacting the heat sink, the lighting element circuitry being attached to the back plate; and an LED PC board positioned in the second section and attached to the housing, said PC board electrically connected to the microcontroller and LED drive/control technology and integrated power supply;

wherein a securing of the back plate to the first section does not increase an overall height of the LED lighting element including the H-shaped housing.

2. The LED lighting element of claim 1, wherein the heat sink is a first thermal pad.

3. The LED lighting element of claim 2, wherein the first thermal pad is adjacent to the back plate.

4. The LED lighting element of claim 1 further comprising a second heat sink located in the second section.

5. The LED lighting element of claim 4, wherein the second heat sink is a second thermal pad positioned between the crossbar and the LED PC board.

6. The LED lighting element of claim 1, wherein:

a protrusion extends inward from the housing proximal to a first end of a first side of the first section;

the back plate includes a leg portion, said leg portions extending into the first section and defining a protrusion receiving section; and the protrusion snaps into the protrusion receiving section, thereby engaging the back plate with the housing.

7. The LED lighting element of claim 6, wherein:

a second protrusion extends inward from the housing into the first section; and said second protrusion limits a distance a first end of the leg portion of the back plate can advance into the first section.

8. The LED lighting element of claim 1, wherein:

the first section of the housing has a first width;

the second section of the housing has a second width; and the first width is greater than the second width.

9. The LED lighting element of claim 1, wherein:

the housing has a first length; and the housing has an outer surface that defines a first groove that extends along the length of the housing.

10. The LED lighting element of claim 1, wherein the first groove is located between the crossbar and the back plate.

11. The LED lighting element of claim 1 further comprising an electrically conductive washer located between the heat sink and the back plate that serves as a primary electrical bonding and grounding path from the lighting element circuitry to the back plate.

12. An LED lighting element comprising:

an H-shaped housing, said housing having a first section and a second section separated from the first section by a crossbar;

a back plate opposite the crossbar, said back plate removably secured to the first section;

a heat sink located within the housing;

lighting element circuitry comprising a microcontroller and LED drive/control technology and integrated power supply contacting the heat sink; and an LED PC board positioned in the second section and attached to the housing, said PC board electrically connected to the microcontroller and LED drive/control technology and integrated power supply;

wherein:

the housing has at least one end;

an end cap attaches to the at least one end of the housing, the end cap comprised of:

a first element having:

a first pair of mounting legs proximal to a first end;

a second pair of mounting legs adjacent to the second end; and a cable access portion adjacent the second end;

a second element having:

a cable access portion adjacent a first end;

a pair of mounting legs perpendicular to and adjacent the first end, wherein the first and second elements are made of a first material and the cable access portion of each element is made of a second material that is more flexible than the first material and covers a majority of the cable access portion.

13. The LED lighting element of claim 12, wherein the cable access portion of the first element is capable of separating from the cable access portion of the second element.

14. The LED lighting element of claim 12, wherein:

connection prongs extend from the an end of each of the mounting legs; and the connection prongs fit in respective holes in the side of the housing, thereby connecting the first and second element of the end cap to the housing.

15. An LED lighting assembly, comprising:

an LED lighting element comprising:

an H-shaped housing, said housing having a first section and a second section separated from the first section by a crossbar;

a back plate opposite the crossbar, said back plate removably secured to the first section;

a heat sink located within the housing;

lighting element circuitry comprising a microcontroller and LED drive/control technology and integrated power supply contacting the heat sink; and an LED PC board positioned in the second section and attached to the housing, said PC board electrically connected to the microcontroller and LED drive/control technology and integrated power supply;

an assembly housing that encloses the LED lighting element, the LED lighting element being attached to the assembly housing, the assembly housing comprising:

a first component having a plurality of sides defining a void that receives the LED lighting element; and a lens removably attached to the first component, thereby enclosing the void.

16. The LED lighting assembly of claim 15, wherein the lens snaps together with the first component.

17. The LED lighting assembly of claim 15, wherein the void is a channel.

18. The LED lighting assembly of claim 15, wherein:

a lanyard has a first end attached to the first component; and a second end of the lanyard is attached to the lens so as to secure the lens to the first component.

19. The LED lighting assembly of claim 18, wherein the first end of the lanyard is attached to an inner surface of one of the plurality of sides of the first component.

20. The LED lighting assembly of claim 15, wherein one of the plurality of sides defines a hole.

21. The LED lighting assembly of claim 15, wherein:

one of the plurality of sides is rectangular; and at least two of the plurality of sides are trapezoids, each of the two trapezoidal sides being opposite one another.

22. The LED lighting assembly of claim 21, wherein at least one of the two trapezoidal sides defines a hole.

23. The LED lighting assembly of claim 21, wherein the wiring bundle extends through the void.

24. The LED lighting assembly of claim 15, the lens is in the shape of oval.

25. The LED lighting assembly of claim 15, wherein the lens has a smooth outer surface.

26. The LED lighting assembly of claim 15, wherein the plurality of sides equals five.

27. The LED lighting assembly of claim 15, further comprising:

a mounting clamp that attaches the lighting element to the assembly housing;

wherein:

the H-shaped housing has a first side and a second side that is opposite the first side;

two grooves are scored along the opposite first and second sides; and the mounting clamp fits into each of the two grooves for mounting the lighting element.

28. The LED lighting assembly of claim 15, further comprising:

a mounting bracket comprising:

attachment elements for attaching the mounting bracket to an external element; and a first mounting clamp and a second mounting clamp shaped with mating surfaces to the H-shaped housing that are attached to a portion of the mounting bracket at predefined angles.

29. An LED lighting assembly, comprising:

an assembly housing; and an LED lighting element comprising:

an H-shaped housing, said housing having a first section and a second section separated from the first section by a crossbar;

a back plate opposite the crossbar, said back plate removably secured to the first section;

a heat sink located within the housing;

lighting element circuitry comprising a microcontroller and LED drive/control technology and integrated power supply contacting the heat sink; and an LED PC board positioned in the second section and attached to the housing, said PC board electrically connected to the microcontroller and LED drive/control technology and integrated power supply;

wherein the lighting element is attached to the assembly housing, wherein:

the assembly housing comprises:

a lighting-element mounting portion, said lighting-element mounting portion having a first surface extending approximately 90° from the lighting-element mounting portion, and a second surface extending approximately 90° from the lighting-element mounting portion opposite the first end; and a cabin mounting bracket surrounding the lighting-element mounting portion, the cabin mounting bracket having a mounting surface angled approximately 45° with respect to the lighting-element mounting portion, the cabin mounting having a triangular cross-section shape, and a surface of the LED lighting element containing the LEDs being parallel to one of the triangle sides.

30. The LED lighting assembly of claim 29, wherein the LED lighting element is mounted flush to a first surface of the lighting-element mounting bracket.

31. The LED lighting assembly of claim 30, wherein:

a first mounting clamp and a second mounting clamp is attached to the first surface of the lighting-element mounting bracket; and the LED lighting element is attached to the first and second mounting clamps.

32. The LED lighting assembly of claim 29, wherein a first and a second wiring bundle extend from the housing.

33. The LED lighting assembly of claim 32, wherein:

the first wiring bundle is connected to a main power source; and the second wiring bundle is connected to an emergency power source.

* * * * *